United States Patent [19]

Fuzesi et al.

[11] Patent Number: 4,699,931

[45] Date of Patent: Oct. 13, 1987

[54] OXAZOLIDONE-MODIFIED ISOCYANURATE FOAMS AND A COMPOSITION AND METHOD FOR THEIR PRODUCTION

[75] Inventors: Stephen Fuzesi; Robert W. Brown, both of Hamden, Conn.

[73] Assignee: Olin Corporation, Cheshire, Conn.

[21] Appl. No.: 855,992

[22] Filed: Apr. 25, 1986

[51] Int. Cl.$^4$ .................. C08J 9/00; C08G 18/00; C08G 18/14

[52] U.S. Cl. ................... 521/117; 521/156; 521/160; 521/902

[58] Field of Search ............ 521/156, 160, 117, 902

[56] References Cited

U.S. PATENT DOCUMENTS

| | | | |
|---|---|---|---|
| 3,198,851 | 8/1965 | Hoy | 260/836 |
| 3,242,108 | 3/1966 | McGary et al. | 260/2.5 |
| 3,313,747 | 4/1967 | Schramm | 260/2.5 |
| 3,673,128 | 6/1972 | Hayash et al. | 521/156 |
| 3,793,236 | 2/1974 | Ashida et al. | 260/2.5 |
| 3,849,349 | 11/1974 | Frisch et al. | 260/2.5 AW |
| 4,003,859 | 1/1977 | Reymore et al. | 521/156 |
| 4,220,731 | 9/1980 | Zuppinger | 521/156 |
| 4,258,137 | 3/1981 | Cogliano | 521/156 |

OTHER PUBLICATIONS

Nicholas. L. and G. T. Gmitter, "Heat Resistant Rigid Foams by Trimerization of Isocyanate Terminated Prepolymers", *Journal of Cellular Plastics*, 1965, pp. 85–90.

*Primary Examiner*—John Kight
*Assistant Examiner*—Dennis R. Daley
*Attorney, Agent, or Firm*—Dale Lynn Carlson; Thomas P. O'Day

[57] ABSTRACT

Oxazolidone-containing isocyanurate foams characterized by thermal stability at a temperature of about 140° C. or higher. These foams are produced by reacting at least one polyisocyanate with at least one polyepoxide in the presence of catalyst, surfactant, and blowing agent.

23 Claims, No Drawings

OXAZOLIDONE-MODIFIED ISOCYANURATE FOAMS AND A COMPOSITION AND METHOD FOR THEIR PRODUCTION

BACKGROUND OF THE INVENTION

1. Field of the Invention

This invention relates to a composition and method useful in fabricating high temperature degradation resistant rigid foams and is more particularly concerned with a composition and method useful in fabricating thermally stable urethane-free oxazolidone-modified isocyanurate foams and to the foams so prepared.

2. Description of the Prior Art

The formation of cellular polymers from polyisocyanates in the presence of epoxides has been described previously. For example, Nicholas and Gmitter, *Journal of Cellular Plastics*, pages 85 to 90, January 1965, (see also French Pat. No. 1,441,565) describe the polymerization of a polyisocyanate or an isocyanate-terminated prepolymer, preferably in the presence of a polyol, using as catalyst a minor proportion of a polyepoxide and certain tertiary amines. In this instance the combination of polyepoxide and tertiary amine is employed in catalytic amounts, the main reaction being the polymerization of the polyisocyanate to form a polyisocyanurate.

Hoy, U.S. Pat. No. 3,198,851 describes the "one-shot" preparation of non-cellular products by reacting a polyisocyanate and a polyepoxide, in proportions which include substantially stoichiometric proportions, in the presence of a boron trifluoride-tertiary amine complex. The reaction mixture is heated to a temperature at which free boron trifluoride is liberated from the complex in order to initiate the reaction. No teaching is made of the one-shot preparation of cellular polymers by the above reaction.

McGary et al, U.S. Pat. No. 3,242,108 describes the preparation, inter alia, of cellular polymers by reacting a polyisocyanate and a polyepoxide in the presence of a low molecular weight polyol, usually an aliphatic diol or triol, and a boron trifluoride-amine complex as catalyst. The resulting cellular polymers contain substantial proportions of polyurethane linkages, derived by reaction of the polyisocyanate with the polyol, and are accordingly limited thereby in their ability to resist deformation on exposure to high temperatures.

Schramm, U.S. Pat. No. 3,313,747 describes the preparation of polymerizable isocyanato-substituted 2-oxazolidinone by reacting an excess of polyisocyanate with a polyepoxide in the presence of a quaternary ammonium halide and a low molecular weight primary or secondary monohydric alcohol. The polymerizable isocyanato-substituted 2-oxazolidinone is then converted to a cellular polymer by reaction with water.

Ashida et al, U.S. Pat. No. 3,793,236 discloses oxazolidone-modified isocyanurate resins prepared by a pre-polymer of "two-shot" method; including the steps of (a) reacting a polyisocyanate with a polyepoxide in the presence of an oxazolidone-formation catalyst to form an isocyanate-terminated polyoxazolidone and then (b) trimerizing the isocyanate of the isocyanate-terminated polyoxazolidone in the presence of a trimerization catalyst to produce an oxazolidone modified isocyanurate resin. Comparision Formulation C described in Example 1, Table II at column 9 of the '236 patent described therein as a "one-shot" formulation containing 9 parts by weight of a polyepoxide (EPON 828) based on 100 parts by weight of polyepoxide and polyisocyanate (EPON 828 plus ISONATE 135). The friability of a "one-shot" foam prepared using Formulation C is disclosed in Table II of the '236 patent as being very high (68 percent weight loss) as compared to an analogous, but "two-shot" foam prepared using Formulation A from Table II of the '236 patent.

Hayash et al, U.S. Pat. No. 3,673,128 discloses polyoxazolidone foams produced by reacting a polyepoxide with a polyisocyanate in a proportion of from about 0.70 equivalent to about 1.25 equivalents of polyepoxide per equivalent of polyisocyanate. However, the use of such high relative amounts of polyepoxide is costly since commercial polyepoxides are about twice as expensive as polyisocyanates. Moreover, the use of these ratios of polyepoxide to polyisocyanate have been found to produce such a strong exothermic reaction as to cause scorching and associated thermal degradation of interior portions of the foam during fabrication thereof.

SUMMARY OF THE INVENTION

It has now been found in accordance with the present invention that urethane-free foams having outstanding resistance to thermal degradation can be prepared in a one-shot procedure by the reaction of polyisocyanates and polyepoxides specified proportions, whereby less than a stoichiometric amount of polyepoxide is used. These foams not only resist thermal degradation, but also, due to the small proportion of polyepoxide used, do not tend to scorch during production of the foam and are relatively inexpensive to fabricate using the "one-shot" production method.

In one aspect, the present invention relates to a polyol-free composition useful for fabricating a high temperature degradation-resistant, rigid urethane-free oxazolidone-modified isocyanurate foam comprising:

(a) at least one polyisocyanate having an isocyanate equivalent weight of between about 80 and about 160, (b) at least one polyepoxide present in an amount of between about 0.1 and about 0.6 equivalents of polyepoxide per equivalent of said polyisocyanate, (c) at least one catalyst to promote isocyanate trimerization and reaction of said polyepoxide with said polyisocyanate, and (d) at least one blowing agent.

In another aspect, the present invention relates to a "one-shot" or "one-step" method of producing a high temperature degradation resistant, rigid urethane-free oxazolidone-modified isocyanurate foam by reacting a polyol-free composition comprising at least one polyisocyanate having an isocyanate equivalent weight of between about 80 and about 160 with at least one polyepoxide in an amount of between about 0.1 and about 0.6 equivalents of polyepoxide per equivalent of said polyisocyanate in the presence of at least one catalyst to promote isocyanate trimerization and reaction of said polyepoxide with said polyisocyanate, and at least one blowing agent. In this method, the polyisocyanate (the "A-side" stream) and polyepoxide (the "B-side" stream) are reacted in the presence of the catalyst and blowing agent, and preferably also a surfactant to assist in cell formation.

In yet another aspect, the present invention relates to the foam produced by the above method.

DETAILED DESCRIPTION OF THE INVENTION

The preparation of the foam forming composition of the invention is readily accomplished by bringing together the polyisocyanate, the polyepoxide, the catalyst, the blowing agent and any other adjuvants (as discussed hereinafter) using agitation means sufficient to ensure homogeneity in the resultant mixture. The mixing of the components can be carried out by hand, when operating on a small scale, but is advantageously carried out using the various mixing and dispensing machines conventionally employed in the manufacture of polymer foams; see, for example, Ferrigno "Rigid Plastic Foams," Reinhold Publishing Corporation, New York, 1963.

Immediately after completion of mixing of the components, the foam reaction mix is poured or dispensed directly into the appropriate mold and foaming is allowed to take place in the mold in accordance with procedures well recognized in the art for the molding of polymer foams.

Polymer foam formation takes place spontaneously after mixing of the various reactants set forth above, and it is unnecessary to employ any heat in order to initiate the foam producing reaction. Indeed, the foam producing reaction is exothermic, more so than is the case with most polymer foam forming systems, such as polyurethane foam forming systems encountered in the art. Accordingly, allowance is made for this exothermicity in designing the molds employed with the polymer foams of the invention.

In a preferred embodiment of the "one-shot" method of the present invention, the isocyanate-containing stream (commonly referred to as the "A-side") and the polyepoxide-containing stream (commonly referred to as the "B-side") are mixed and to the resulting mixture is added a catalyst-containing stream (referred to as the "C-side"). Each of these streams are preferably liquids in which all of the various additives are preferably soluble, although dispersions utilizing solid components can be employed if desired. In addition, each of the streams are preferably shelf-stable at ambient temperature (e.g. from about 10° C. to about 40° C.) for a at least three months. In accordance with a preferred embodiment of the present invention, the B-side contains polyepoxide, blowing agent, and a surfactant to assist in foam cell formation. These three ingredients are appropriately selected to provide a combination of "B-side" stability and additive solubility, as discussed above.

A typical "B-side" formulation is prepared by blending:

| | |
|---|---|
| DER-331 (a polyepoxide product of Dow Chemical Company) | 15.75 g |
| DC-193 (a silicone surfactant product of Dow Corning Corporation) | 2.00 g |
| R-11 B (a fluorocarbon blowing agent product of E. I. du Pont de Nemours and Company, Inc.) | 11.00 g |

After thorough mixing of this blend at room temperature, the blend forms a clear solution having a viscosity of about 100 cps at room temperature. This clear solution is "shelf" stable during more than 20 weeks of storage at room temperature with no change in viscosity or phase separation occurring during this time period.

As set forth above, the polyepoxide, as hereinafter defined and exemplified, is employed in a proportion corresponding to about 0.1 equivalent to about 0.6 equivalents per equivalent of polyisocyanate. Preferably, the polyepoxide is employed in a proportion corresponding to about 0.2 equivalent to about 0.6 equivalent per equivalent of polyisocyanate. Below the lower limit of about 0.1 equivalent of polyepoxide per equivalent of polyisocyanate the resulting foam is expected to be excessively friable. Above the upper limit of about 0.6 equivalents of polyepoxide per equivalent of polyisocyanate, the resulting foam is expected to undergo excessive interior scorching and associated foam cell structure degradation during fabrication due to the increased exotherm of reaction by the additional polyepoxide. By "equivalents" of polyepoxide is meant the molecular weight of the latter divided by the number of epoxy groups present in the molecule. The equivalent weight is expressed in whatever units, i.e., grams, pounds, tons, etc., are used to designate the amounts of the other components of the reaction mixture. Similarly, the term "equivalent" used in relation to the polyisocyanate has its usually accepted meaning, namely, the molecular weight of the polyisocyanate, in whatever units are used to designate the amounts of the various components of the reaction mixture, divided by the number of isocyanate groups present in the molecule.

The polyisocyanate employed in the preparation of the cellular polymers of the invention can be any of the polyisocyanates, organic and inorganic, known to be useful in the art of polymer formation. Such polyisocyanates are commonly employed in the preparation of polyurethanes by reaction with compounds containing two or more active hydrogen-containing groups (i.e., groups which show a positive reaction when tested by the Zerewitinoff method, *J. Am. Chem. Soc.*, 49, 3181, 1927).

Illustrative of such polyisocyanates are 2,4-tolylene diisocyanate, 2,6-tolylene diisocyanate, 4,4'-methylenebis(phenyl isocyanate), dianisidine diisocyanate, tolidine diisocyanate, hexamethylene diisocyanate, m-xylene diisocyanate 1,5-napthalene diisocyanate, p-phenylene diisocyanate, 1,4-diethylbenzene-$\beta,\beta'$-diisocyanate and other di- and higher polyisocyanates such as those listed in the tables of Siefken, Ann. 562, 122-135 (1949). Mixtures of two or more of the above isocyanates can be used, such as mixtures of the 2,4- and 2,6-isomers of tolylene diisocyanate, mixtures of the 2,4'- and 4,4'-isomers of methylenebis(phenyl isocyanate) and the like. In addition to the 4,4'-methylenebis(phenyl isocyanate) or mixtures of the 2,4'-isomer and 4,4'-isomer thereof which are employed as the isocyanate component, there can also be used modified forms of these isocyanates. For example, there can be used 4,4'-methylenebis(phenyl isocyanate), or an admixture thereof with a minor amount of the 2,4'-isomer, which has been treated to convert a minor proportion, generally less than 15 percent by weight of the starting material, to an artifact of said starting material. For example, the polyisocyanate component can be methylenebis(phenyl isocyanate) which has been converted to a stable liquid at temperatures of about 1520 C. and higher using, for example, the processes described in Belgian Pat. No. 678,773.

Illustrative of another modified form of 4,4'-methylenebis(phenyl isocyanate) which can form the polyisocyanate component is the product obtained by treating the former compound, or mixtures thereof with small portions of 2,4'-isomer, with a minor portion of a carbodiimide such as diphenylcarbodiimide in accordance, for example, with the procedure described in British Pat. No. 918,454. In accordance with said process, a minor proportion of the methylenebis(phenyl isocyanate) is converted to the corresponding isocyanato-carbodiimide and there is obtained a mixture of a major proportion of unchanged starting material and a minor proportion of said isocyanato-substituted carbodiimide.

In addition to the various modified forms of methylenebis(phenyl isocyanate) exemplified above there can also be employed as the polyisocyanate component a mixture of methylene-bis(phenyl isocyanate) with polymethylene polyphenyl isocyanates of higher functionality. Such mixtures are generally those obtained by phosgenation or corresponding mixtures of methylene bridged polyphenyl polyamines. The latter, in turn, are obtained by interaction of formaldehyde, hydrochloric acid and primary aromatic amines, for example, aniline, o-chloroaniline, o-toluidine and the like. Such polyamines, and polyisocyanates prepared therefrom, are known in the art, see, for example, U.S. Pat. Nos. 2,683,730; 2,950,263; 3,012,008 and 3,097,191; Canadian Pat. No. 665,495; and German Pat. No. 1,131,877. The preferred polyisocyanates are methylenebis(phenyl isocyanates) and the modified forms thereof including mixtures of polymethylene polyphenyl isocyanates containing from about 35 percent by weight to about 85 percent by weight of methylenebis(phenyl isocyanate). The most preferred polyisocyanate is a polymethylene polyphenyl isocyanate mixture containing from about 35 percent by weight to about 60 percent by weight of methylenebis(phenyl isocyanate), the remainder of said mixture being polymethylene polyphenyl isocyanates having a functionality greater than 2.0.

The polyepoxides employed in the composition of the invention can be any compound containing two or more epoxide

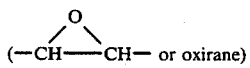

groups. The preferred polyepoxides used in preparing the cellular polymers of the invention are homocyclic polyepoxides.

Such epoxides are characterized by the presence of at least two epoxy groups each of which is present in a substituent attached to a cyclic hydrocarbon compound or is fused to a nonaromatic ring in a cyclic hydrocarbon compound. Examples of homocyclic polyepoxides are:

1. the glycidyl ethers of polyhydric mononuclear and fused ring phenols such as resorcinol, hydroquinone, pyrocatechol, saligenin, phloroglucinol, 1,5-dihydroxynaphthalene, 1,6-dihydroxynaphthalene, 1,7-dihydroxynaphthalene and the like;

2. the glycidyl ethers of non-fused polynuclear phenols represented by the general formula:

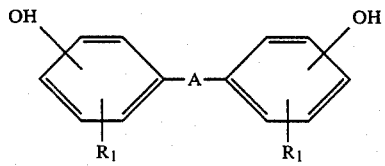

where $R_1$ represents from 0 to 4 substituents selected from the class consisting of halogen and lower-alkyl, A is a bridging group selected from the class consisting of

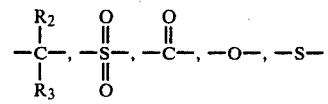

and a single covalent bond, wherein $R_2$ and $R_3$ each represent a moiety selected from the class consisting of hydrogen, lower-alkyl, lower-cyclo-alkyl and aryl. Illustrative of such compounds are the bis(glycidyl ethers) of:

4,4'-dihydroxydiphenylsulfone
4,4'-dihydroxybiphenyl,
4,4'dihydroxybenzophenone,
di(4-hydroxyphenyl)methane(bisphenol F),
2,2-di(4hydroxyphenyl)butane(bisphenol B),
2,2-di(4-hydroxyphenyl)propane(bisphenol A),
1,1-di(4-hydroxyphenyl)propane,
3,3-di(3-hydroxyphenyl)pentane,
2-(3-hydroxyphenyl)-2-(4-hydroxyphenyl)butane,
1-phenyl-1-(2-hydroxyphenyl)-1-(3-hydroxyphenyl)-propane,
1-phenyl-1,1-di(4-hydroxyphenol)butane,
1-phenyl-1,1-di(4-hydroxyphenyl)pentane,
1-tolyl-1,1-di(4-hydroxyphenyl)ethane,
bis(3-bromo-4-hydroxyphenyl)methane,
2,2-bis(3-bromo-4-hydroxyphenyl)propane,
bis(3-bromo-4-hydroxyphenyl)diphenylmethane,
1,1-bis(3-bromo-4-hydroxyphenyl)-1-(2,4-dibromophenyl)ethane,
2,2-bis(3-bromo-4-hydroxyphenyl)propionitrile,
bis(3,5-dibromo-4-hydroxyphenyl)diphenylmethane,
1,1-bis(3,5-dibromo-4-hydroxyphenyl)-1-(2,5-dibromophenyl)ethane,
bis(3-bromo-4-hydroxyphenyl)sulfone,
bis(3,5-dibromo-4-hydroxyphenyl)sulfone;

3. the glycidyl ethers of novolac resins. The novolac resins are the products obtained by acid condensation of phenol, or a substituted phenol, with formaldehyde and are conventionally represented by the general formula:

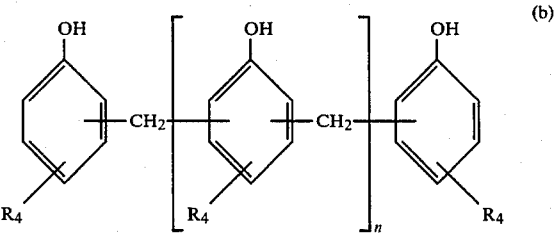

wherein n has an average value of from about 2 to 12 and $R_4$ represents from 0 to 4 substituents selected from halogen and lower alkyl groups. It is to be understood that the above formula is highly idealized and is an approximation only; see, for example, Carswell, *Phenoplasts,* pages 29–35, Interscience, New York, 1947. A wide range of novolac resins of differing molecular weights is available commercially, all of which are represented approximately by the above formula. Since the class of novolac resins is so well recognized in the art, the epoxides derived therefrom by conversion of the novolacs to their glycidyl ethers (by conventional procedures, e.g., reaction with epichlorohydrin) will be referred to hereafter as "novolac resin glycidyl ethers;"

4. dicyclopentadiene dioxide, i.e., the compound having the formula:

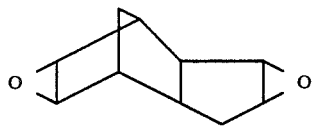
(c)

5. The vinyl cyclohexene dioxide, i.e., the compound having the formula:

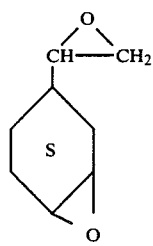
(d)

6. the dicyclohexyl oxide carboxylates represented by the general formula:

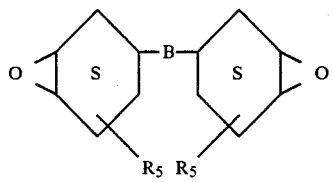
(e)

wherein $R_5$ in each instance represents from 0 to 9 lower-alkyl groups, and B represents a bivalent radical selected from the class consisting of:

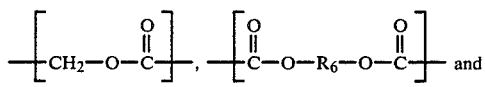

wherein $R_6$ is selected from the class consisting of lower-alkylene and lower-oxyalkylene and $R_7$ is selected from the class consisting of lower-alkylene and arylene. Examples of the dicyclohexyl oxide carboxylates are:
3,4-epoxycyclohexylmethyl 3,4-epoxycyclohexanecarboxylate,
3,4-epoxy-6-methylcyclohexylmethyl 3,4-epoxy-6-methylcyclohexylcarboxylate,
bis(3,4-epoxycyclohexylmethyl)maleate,
bis(3,4-epoxycyclohexylmethyl)succinate,
ethylene glycol bis(3,4-epoxycyclohexanecarboxylate),
2-ethyl-1,3-hexanediol bis(3,4-epoxy-6-methylcyclohexanecarboxylate) and the like.

7. the glycidyl derivatives of aromatic primary amines represented by the formula:

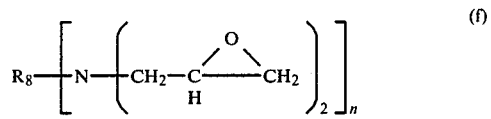
(f)

wherein n is an integer of from 1 to 3 and $R_8$ is an aromatic residue of valency n selected from the class consisting of aromatic residues having the formulae:

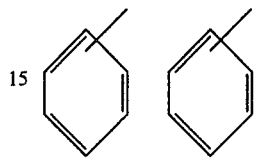

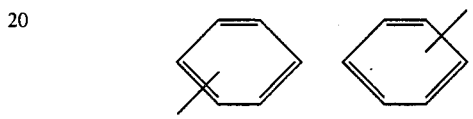

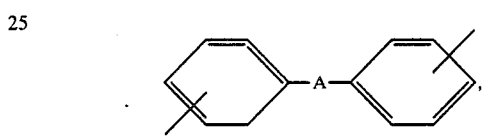
and

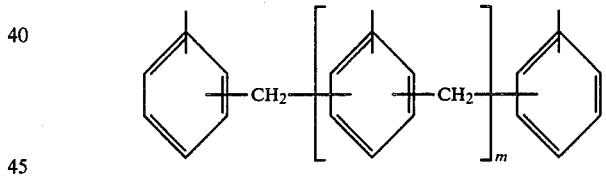

wherein A is a bridging group as hereinbefore defined and m is a number having an average value of from about 1.0. Illustrative of such compounds are the N,N-diglycidyl derivatives of:
aniline,
2,4-tolylene diamine,
2,6-tolylene diamine,
m-phenylene diamine,
p-phenylene diamine,
4,4'-diamino-diphenyl,
4,4'-diamino-diphenyl methane,
2,2-di(4-aminophenyl)propane,
2,2-di(4-aminophenyl)butane,
4,4'-diamino-diphenyl sulfide,
4,4'-diamino-diphenyl sulfone,
4,4'-diamino-diphenyl ether,
1,5-diamino-napthalene, and
methylene-bridged polyphenyl polyamines from about 35 percent by weight to about 85 percent by weight of methylenedianilines, the remaining parts of said mixture being triamines and polyamines of higher molecular weight, said polyamine mixture having been formed by acid condensation of aniline and formaldehyde. The latter polyamine mixtures can be prepared by procedures well-known in the art; see, for example, British Patent Specification No. 1,042,220.

The term "lower-alkyl" is used throughout this specification and claims as meaning alkyl containing from 1 to 6 carbon atom such as methyl, ethyl, propyl, butyl, pentyl, hexyl, and isomeric forms thereof. The term "halogen" means fluorine, chlorine, bromine, and iodine. The term "lower-alkylene" means alkylene containing from 1 to 6 carbon atoms such as methylene, ethylene, 1,3-propylene, 1,4-butylene, 2,3-butylene, 1,6-hexylene and the like. The term "lower-cycloalkyl" means cycloalkyl from 4 to 8 carbon atom such as cyclobutyl, cyclopentyl, cyclohexyl, cycloheptyl and cyclootyl. The term "lower-oxyalkylene" means lower-alkylene, as defined above, interrupted by the radical —O—. The term "arylene" means a bivalent radical, such as phenylene, tolylene, xylylene, biphenylene and the like, derived from an aromatic hydrocarbon by removal of a hydrogen atom from each of two carbon atoms of the nucleus. The term "aryl" means the moiety obtained by removing one hydrogen atom from an aromatic hydrocarbon of from 6 to 12 carbon atoms, inclusive. Illustrative of aryl moietites are phenyl, tolyl, xylyl, biphenylyl, naphthyl and the like.

The homocyclic polyepoxides described and exemplified hereinabove are, for the most part, well-known in the art and can be prepared by methods well-known in the art; see, for example, Lee and Neville, Epoxy Resins, McGraw-Hill Book Company, New York (1957), U.S. Pat. Nos. 2,633,458; 2,716,123; 2,745,847; 2,745,285; 2,872,427; 2,884,408; 2,902,518; 2,921,027; 3,312,664; 3,268,619; 3,325,452 and British Pat. No. 614,235.

While any of the homocyclic polyepoxide compounds exemplified hereinabove can be used in the preparation of the high temperature resistant polymers of the invention, the preferred compounds for this purpose are those of the groups (2), (3), and (7) set forth above, namely, the glycidyl ethers of non-fused polynuclear phenols represented by the formula (a) above, the novolac resin glycidyl ethers represented by formula (b) above, and the glycidyl derivatives of primary aromatic amines represented by the formula (f) above. The use of epoxides of these classes gives rise to cellular polymers of the invention which possess the highest resistance to deformation by heat and the lowest flame spread rating of the cellular polymers of this class.

Within this particular group of polyepoxides we have found that those which are derived from phenols of the formula (b) above are the most preferred since they give rise to cellular polymers having the highest resistance to flame spread and heat deformation.

The amount of catalyst employed in the compositions of the present invention is a "catalytically effective" amount, i.e., an amount sufficient to catalyze the reaction of polyisocyanate and polyepoxide to form polyoxazolidone and also to effect trimerization of the molar excess of polyisocyanate (vis-a-vis the polyepoxide) to produce isocyanurate linkages. Advantageously, the catalyst is employed in an amount corresponding to between about 1.0 and about 10 weight percent based on the weight of the total composition. Preferably, the catalyst is a tertiary amine employed in a more preferred amount corresponding to between about 3 and about 7 weight percent based on the weight of the total composition, although tin catalysts such as dibutyltin dilaurate, or mixtures of amine and tin catalysts are also suitably employed.

Useful tertiary amines are those which are generally employed to catalyze the reaction between an isocyanato group and an epoxide group. Such catalysts are a group of compounds well-recognized in the art of synthesizing polyurethanes; see, for example, Saunders et al, *Polyurethanes, Chemistry and Technology*, Part I, pages 228–230, Interscience Publishers, New York, 1964, see also Burkus, J., *Journal of Organic Chemistry*, 26, pages 779–782, 1961.

Representative of said tertiary amine catalysts are: N,N-dialkylpiperazines such as N,N-dimethylpiperazine, N,N-diethylpiperazine and the like; trialkylamines such as trimethylamine, triethylamine, tributylamine and the like; 1,4-diazabicyclo(2-2-2)octane, which is more frequently referred to as triethylene diamine, and the lower-alkyl derivatives thereof such as 2-methyl triethylene diamine, 2,3-dimethyl triethylene diamine, 2,5-diethyl triethylene diamine and 2,6-diisopropyl triethylene diamine; N,N',N''-trialkylaminoalkylhexahydrotriazines such as N,N'N''-tris(dimethylaminomethyl)-hexahydrotriazine, N,N',N''-tris(dimethylaminoethyl)hexahydrotriazine, N,N',N''-tris(dimethylaminopropyl)hexahydrotriazine, N,N',N''-tris(diethylaminoethyl)hexahydrotriazine, N,N',N''-tris(diethylaminopropyl)hexahydrotriazine and the like; mono-, di-, and tri-(dialkylaminoalkyl) monohydric phenols or thiophenols such as 2-(dimethylaminomethyl)phenol, 2-(dimethylaminobutyl)phenol, 2-(diethylaminoethyl)-phenol, 2-(diethylaminobutyl)phenol, 2-(dimethylaminomethyl)thiophenol, 2-(diethylaminoethyl)thiophenol, 2,4-bis(dimethylaminoethyl)phenol, 2,4-bis(dipropylaminobutyl)phenol, 2,4-bis(dipropylaminoethyl)-phenol, 2,4-bis(dimethylaminoethyl)thiophenol, 2,4-bis(diethylaminopropyl)thiophenol, 2,4-bis(dipropylaminoethyl)-thiophenol, 2,4,6-tris(dimethylaminoethyl)phenol, 2,4,6-tris(diethylaminoethyl)-phenol, 2,4,6-tris(dimethylaminobutyl)phenol, 2,4,6-tris(dipropylaminomethyl)phenol, 2,4,6-tris(diethylaminoethyl)thiophenol, 2,4,6-tris(dimethylaminoethyl)thiophenol and the like; N,N,N',N'-tetraalkylalkylenediamines such as N,N,N',N'-tetramethyl-1,3-propane diamine, N,N,N',N'-tetreamethyl-1,3-butanediamine, N,N,N',N'-tetramethylethylenediamine and the like; N,N-dialkylcyclohexylamines such as N,N-dimethylcyclohexylamine, N,N-diethylcyclohexylamine and the like; N-alkylmorpholines such as N-methylmorpholine, N-ethylmorpholine and the like; N,N-dialkylalkanolamines such as N,N-dimethylethanolamine, N,N-diethylethanolamine and the like; N,N,N',N'-tetraalkylguanidines such as N,N,N',N'-tetramethylguanidine, N,N,N',N'-tetraethylguanidine and the like.

The preferred tertiary amine catalyst is 2,4,6-tris(-dialkylaminoalkyl)phenol (commercially available as "DMP-30" a product of Rohm & Haas Company).

If desired, any organometallic compound known to be an isocyanate trimerization catalyst as well as the catalyst in the reaction between an isocyanato group and an active hydrogen-containing group can be employed in the compositions of the present invention; see, for example, Saunders, ibid, Part I, pages 228 to 232, and Britain et al, *Journal Applied Polymer Science* 4, pages 207 to 211, 1960. Such catalysts include the organic acid salts of, and the organometallic derivatives of, bismuth, lead, tin, iron, antimony, uranium, cadmium, cobalt, thorium, aluminum, mercury, zinc, nickel, cerium, molybdenum, vanadium, copper, manganese, and zirconium. The preferred group of said organometallic derivatives is that derived from tin, examples of this preferred group are: dibutyltin diacetate, dibutyltin dilaurate, stannous octoate, stannous oleate, and the like.

The blowing agent which is employed in the compositions of the invention can be water (which generates carbon dioxide by reaction with isocyanate) or a volatile organic solvent such as the lower molecular weight halogenated aliphatic hydrocarbons, namely, those of boiling points from about −40° to about 200° C., preferably from about −10° C. to about 110° C. Illustrative of such halogenated aliphatic hydrocarbons are difluoromonochloromethane, trichloromonofluoromethane, dichlorodifluoromethane, chlorotrifluoromethane, 1,1,2-trichloro-1,2,2trifluoroethane, 1,1-dichloro-1-fluoroethane, 1-chloro-1,1-difluoro-2,2-dichloroethane, 1,1,1-tribromo-2-chloro-2-fluorobutane, methylene chloride and the like.

Generally speaking, the amount of blowing agent employed depends upon the desired density. Thus, if low density foams, i.e., 2 to 10 pounds per cubic foot, are desired, the amount of halogenated aliphatic hydrocarbon is from about 5 to about 20 percent by weight based on the total weight of the composition. When water is employed as the blowing agent, the amount required to produce foams of density within the above range is from about 2.0 parts to about 3.0 parts by weight based on the total formulation weight. If desired, a mixture of water and one or more of said halogenated aliphatic hydrocarbons can be employed as blowing agent.

Other optional additives such as dispersing agents, cell stabilizers, surfactants, flame retardants, and the like, which are commonly employed in the fabrication of polymer foams, can be employed in the process of the invention. A finer cell structure may be obtained if water-soluble organosilicone polymers are used as surfactants in the reaction mix. If used, the surfactant is preferably employed in an amount of between about 1.0 and about 5.0 weight percent based on the weight of the composition. Organosilicone polymers obtained by condensing a polyalkoxypolysilane with the monoether of a polyalkylene glycol in the presence of an acid catalyst are representative of those surfactants which can be used for this purpose. Other surfactants such as ethylene oxide modified sorbitan monopalmitate or ethylene oxide modified polypropylene ether glycol may be used, if desired, to obtain better dispersion of the components of the foam mixture.

Other optional additives, such as inorganic and organic fillers, can be employed in the process of this invention. Illustrative inorganic fillers are calcium carbonate, calcium phosphate, silica, glass, wood flakes, antimony oxides, etc. Illustrative organic fillers are the various polymers, copolymers of vinyl chloride, vinyl acetate, acrylonitrile, styrene, melamine, partially oxyalkylated melamine, etc. Melamine and partially oxyalkylated melamine are preferred. Organic esters can also be employed if desired. Particularly preferred esters are those derived from dicarboxylic acids such as oxalic, malonic, succinic, glutaric, maleic, phthalic, isophthalic and terephthalic acids. The use of an organic filler, particularly isophthalic and/or terephthalic esters, is preferred in the composition of the present invention since these organic fillers are liquid and soluble in the "B-side".

The flame retardants which are optionally employed in the compositions of the invention are those flame retardants known in the art which do not contain active hydrogen groups, as hereinbefore defined, i.e., those flame retardants which do not react with the polyisocyanate. Illustrative of such flame retardants are: tris(-haloalkyl)phosphates such as tris-(2-chloroethyl(phosphate, tris)2-bromoethyl(phosphate, tris)2,3-dichloroethyl)phosphate, tris(2,3-dibromoethyl)phosphate, monoammonium phosphate, ammonium polyphosphates, sodium borate, di(2-haloalkyl)-2-haloalkanephosphonates such as di(2-chloro-ethyl) 2-chloroethane phosphonate, di(2-chloropropyl) 2-chloropropane phosphonate, di(2-bromopropyl) 2-bromopropane phosphonate, antimony oxides, polyvinyl chloride resins, dialkyl alkanephosphonates such as dimethyl methylphosphonate, dialkyl allylphosphonate, dimethyl benzylphosphonate, diamyl amylphosphonate, trimethylphosphorothionate, ethylene phenyl phorphorothionate, tetraholobisphenols such as tetrachlorobisphenol A, tetrabromobisphenol A, and the like; said flame retardants are employed in the compositions of the invention in the appropriate amounts necessary to impart the desired degree of flame retardancy to the resulting cellular polymer. In general the amount of flame retardant employed is within the range of about 5 to about 30 percent by weight based on polyepoxide although higher amounts, up to about 60 percent by weight based on polyepoxide, can be employed in the case of those flame retardants which are solid at ambient temperatures.

Without wishing to be bound to any particular theory and in order to aid in an understanding of the invention, we deem it pertinent to point out that the principal reaction, which is believed to take place in the formation of the polymers of this invention, is that which leads to the formation of polyoxazolidinone and isocyanurate.

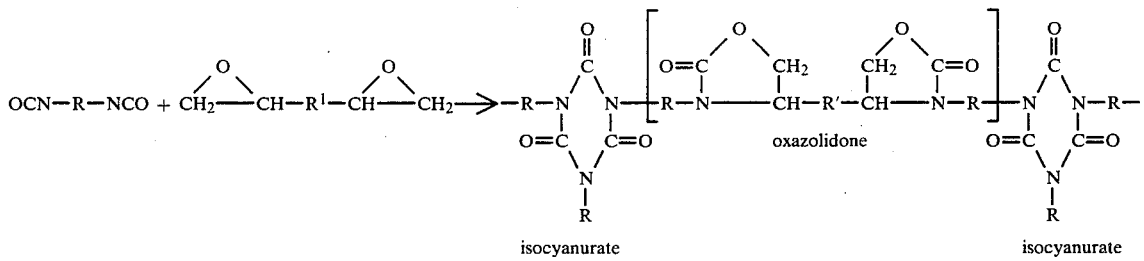

The rigid cellular foams made in accordance with the present invention generally have a density of between about 1.5 and about 20 pcf (preferably between about 2 and about 5 pcf). These foams possess markedly superior high temperature properties as compared with the urethane and urethane-modified isocyanurate cellular polymers that are presently available commercially. On this basis, the cellular products of the invention can be employed for all the purposes for which the currently produced cellular products are conventionally employed and are particularly suitable for applications where higher thermal resistance is required (e.g., thermal resistance at a temperature of at least 140° C. for at least one year or more). For example, the cellular products of the invention can be employed as insulating materials for high temperature pipe lines, tanks, stills, high and low pressure steam lines, etc.

The following examples describe the manner and process of making and using the invention and set forth the best mode contemplated by the inventors of carrying out the invention but are not to be construed as limiting. All parts are by weight unless otherwise stated.

EXAMPLE 1

Preparation of Oxazolidone-Containing Isocyanurate Foams and Conventional Urethane-Containing Isocyanurate Foams and Comparison of the Physical Properites Thereof This example provides a comparison of physical properties of several oxazolidone-containing isocyanurate foams, as compared to a conventional polyurethane foam, and a conventional urethane-oxazolidone-containing isocyanurate foam.

The oxazolidone-containing isocyanurate foams within the scope of the present invention were prepared as follows:

A polyepoxide, (DER-331, a product of Dow Chemical Company having an epoxide equivalent weight of between about 182 and about 190), in an amount of 15.45 grams was blended with 2.0 grams of a surfactant (Dow Corning Corporation's DC-193, a silicone polymer), together with 11 grams of trichloroflouromethane blowing agent (R-11 B, a product of E. I. du Pont de Nemours and Company,·Inc.), and 67.05 grams of a polymeric isocyanate (PAPI-135, a product of Upjohn Company). Into this blend was incorporated 4.5 grams of catalyst [DMP-30, 2,4,6-tri(dimethylaminomethyl-phenol), a product of Rohm and Haas Company]. After thorough mixing, the resulting reaction mixture was poured into a box mold and allowed to free rise and cure at room temperature thereby producing an oxazolidone-containing isocyanurate rigid foam.

The comparison polyurethane foam and the urethane-oxazolidone-containing isocyanurate foam were produced by conventional methods. Specifically, the polyurethane foam was produced as follows:

A sucrose amine based polyol (Poly G 71-530, a product of Olin Corporation having a hydroxide equivalent weight of about 105) in an amount of 35.14 g was blended with 0.70 g of a surfactant (Dow Corning Corporation's DC-193, a silicone polymer) together with 11.98 g of trichlorofluoromethane blowing agent (R-11 B, a product of E. I. du Pont de Nemours and Company, Inc.) and 51.30 g of polymeric isocyanate (PAPI-135, a product of Upjohn Company). Into this blend was incorporated 0.88 g of catalyst (POLYCAT-8 a product of Abbott Laboratories). After thorough mixing, the resulting reaction mixture was poured into a box mold and allowed to free rise and cure at room temperature, thereby producing a conventional polyurethane foam.

Table I below provides the specific formulations for each of the oxazolidone-containing isocyanurate foams within the scope of the present invention, namely Foams 1 through 4, as well as the formulations for the urethane comparison foam (Comparison Foam A) and the urethane-oxazolidone-containing isocyanurate comparison foam (Comparison Foam B). Also, Table I provides physical parameters on the foaming mixture, including cream time, gel time, and tack-free time for each of the foam mixtures. Lastly, physical properties for the foams of the present invention and the comparison foams are provided in Table I, including density, compressive strength, percent closed-cell, and thermal stability measurements at 125° C., 150° C., and 175° C.

TABLE I

OXAZOLIDONE-MODIFIED ISOCYANURATE FOAMS AND COMPARATIVE URETHANE-CONTAINING FOAMS

| | Comparison Foam A | Comparison Foam B | Foam 1 | Foam 2 | Foam 3 | Foam 4 |
|---|---|---|---|---|---|---|
| | | Formulation and Processing Data and Physical Properties | | | | |
| Formulation Additive, Wt. % | | | | | | |
| POLY G-71-530[1] | 35.14 | — | — | — | — | — |
| DER-331[2] | — | 7.88 | 15.45 | 10.45 | — | 7.88 |
| DEN-431[3] | — | 7.88 | — | — | 15.40 | 7.88 |
| TPG[4] | — | 3.45 | — | — | — | — |
| DC-193[5] | 0.70 | 2.00 | 2.00 | 2.00 | 2.00 | 2.00 |
| POLYCAT 8[6] | 0.88 | — | — | — | — | — |
| DMP-30[7] | — | 4.00 | 4.5 | 5.00 | 4.00 | 4.00 |
| R-11B[8] | 11.98 | 11.00 | 11.00 | 11.00 | 11.00 | 11.00 |
| PAPI-135[9] | 51.30 | 63.79 | 67.05 | 71.55 | 67.60 | 67.24 |
| Ratio per Equivalent NCO:Epoxide | — | — | 1.0:0.167 | 1.0:0.106 | 1.0:0.176 | 1.0:0.175 |
| Processing Data | | | | | | |
| Cream Time (sec.) | 20 | 7 | 28 | 13 | 14 | 18 |
| Gel Time (sec.) | 72 | 68 | 62 | 47 | 65 | 70 |
| Tack Free Time (sec.) | 110 | 145 | 154 | 130 | 160 | 170 |
| Foam Physical Properties | | | | | | |
| Density, pcf (ASTM D-1622-63) | 2.26 | 2.00 | 2.23 | 2.22 | 2.20 | 2.20 |
| Compressive Strength, psi | 34.85 | 28.10 | 42.40 | 43.85 | 43.25 | 40.70 |

TABLE I-continued

OXAZOLIDONE-MODIFIED ISOCYANURATE FOAMS AND COMPARATIVE URETHANE-CONTAINING FOAMS

| | Comparison Foam A | Comparison Foam B | Foam 1 | Foam 2 | Foam 3 | Foam 4 |
|---|---|---|---|---|---|---|
| (ASTM D-1621-73) Closed Cell, % (ASTM-D-7856-70) | 96.47 | 97.43 | 98.16 | 97.21 | 96.62 | 97.46 |
| Thermal Stability of Foams After 4 Weeks of Oven Exposure at Specified Temperatures | | | | | | |
| 125° C. Oven Exposure | | | | | | |
| Wt. Loss | 5.77 | 5.93 | 2.77 | 4.01 | 2.95 | 3.70 |
| Volume Change | 27.48* | 0.77 | 0.04 | 0.28 | 0.45 | 0.33 |
| Closed Cell, % | 94.64 | 97.18 | 95.89 | 98.06 | 98.06 | 96.76 |
| 150° C. Oven Exposure | | | | | | |
| Wt. Loss | 19.61 | 5.98 | 3.85 | 5.01 | 3.32 | 3.66 |
| Volume Change | 18.74* | 0.75 | 0.22 | 0.66 | 0.55 | 0.57 |
| Closed Cell, % | 76.00 | 95.54 | 97.04 | 97.42 | 98.27 | 96.16 |
| 175° C. Oven Exposure | | | | | | |
| Wt. Loss | 37.41 | 13.09 | 8.17 | 6.18 | 5.91 | 6.96 |
| Volume Change | 1.61* | −1.60 | 0.08 | 0.51 | 0.10 | 1.23 |
| Closed Cell, % | 45.5 | 62.99 | 97.13 | 96.09 | 98.36 | 99.09 |

[1] POLY G-71-530, a sucrose-amine based polyol having an hydroxide equivalent weight of 105, a product of Olin Corporation.
[2] DER-331, a bisphenol A-based polyepoxide having an epoxide equivalent weight between 182–190, a product of Dow Chemical Company.
[3] DEN-431, a novolac-based polyepoxide having an epoxide equivalent weight between 172–179, a product of Dow Chemical Company.
[4] TPG, tripropylene glycol.
[5] DC-193, a silicone-based surfactant, a product of Dow Corning Corporation.
[6] POLYCAT-8, N,N'dimethylcyclohexylamine, a product of Abbott Laboratories.
[7] DMP-30, a 2,4,6-tri(dimethylaminomethyl)phenol catalyst, a product of Rohm and Haas Company.
[8] R-11B, a trichlorofluoromethane blowing agent, a product of E. I. du Pont de Nemours and Company, Inc.
[9] PAPI-135, a polyisocyanate having a isocyanate equivalent weight of 135, a product of Upjohn Corporation.
*Parallel to foam rise.
*The urethane foam during the heat aging process completely distorted (expansion, shrinkage, etc.)

The results as presented in Table I above demonstrate the superiority of the physical properties of Foams 1 through 4 over the physical properties of the polyurethane foam (Comparison Foam A) and the urethane-oxazolidine-containing isocyanurate foam (Comparison Foam B). More specifically, the compressive strength of Foams 1 through 4, ranging between 40.70 psi and 43.85 psi, is significantly superior to the compressive strength of Comparison Foam A (34.85 psi) and that of Comparison Foam B (28.10 psi).

From a thermal stability standpoint, Foams 1 through 4 provide improved performance at each oven exposure temperature tested, as compared to Comparison Foam A. Note that Comparison Foam A suffered a volume change of 27.48 percent, as compared to a volume change of only between 0.04 and 0.45 for Foams 1 through 4. In addition, Comparison Foam A showed complete distortion caused by expansion and shrinkage at each of the test temperatures of 125° C., 150° C., and 175° C. Comparison Foam B showed a distinct decrease in closed cell content at the oven exposure temperature of 175° C., providing a closed-cell content at that temperature of 62.99 percent. In contrast, at that oven exposure temperature of 175° C., Foams 1 through 4 maintained a closed-cell content of between 96.09 and 99.09. Thus, Foams 1 through 4 provided improved thermal stability as compared to both Comparison Foam A and Comparison Foam B.

EXAMPLE 2

Preparation of Oxazolidone-Modified Isocyanurate Foams at the Low End of Ratio of Equivalent Weight of NCO to Epoxide of the Present Invention This example provides a comparison of the friability property of various oxazolidone-modified isocyanurate foams. These foams were produced in accordance with the procedure given in Example 1 using the foam formulations given in Table II below. Two of the foams, namely Foams 5 and 6 as identified in TABLE II below, have ratios of equivalent weight of NCO to epoxide at the low end of the presently-claimed limit within the scope of the present invention. The third foam, namely Comparison Foam C identified in Table II below, has a ratio of equivalent weight of NCO to epoxide below the presently-claimed limit. The friability results are presented in Table II below.

TABLE II

Oxazolidone-Modified Isocyanurate Foams Comparative Data for Friability of the Foam

| | Comparison Foam C | Foam 5 | Foam 6 |
|---|---|---|---|
| Foam Formulation, Wt. % | | | |
| DER-331[2] | 5.0 | 10.0 | 15.0 |
| DC-193[4] | 2.0 | 2.0 | 2.0 |
| DMP-30[7] | 5.0 | 5.0 | 5.0 |
| R-11 B[8] | 12.0 | 12.0 | 12.0 |
| PAPI-135[9] | 76.0 | 71.0 | 66.0 |
| Ratio of Equiv. Wt. NCO:Epoxide | 1.0–0.05 | 1.0–0.1 | 1.0–0.175 |
| Processing Data | | | |
| Cream Time (sec.) | 13.0 | 13.0 | 14.0 |
| Gel Time (sec.) | 59.0 | 54.0 | 51.0 |
| Tack Free Time (sec.) | 154.0 | 153.0 | 147.0 |
| Friability[10] | Very excessive powdery Not acceptable for use as a foam | Moderate good cell structure | Good strong cell structure |

[2], [4], [7], [8], [9] Refer to the footnotes which appear in TABLE I above.
[10] A visual measurement after hand-rubbing the foam to test for powderization thereof.

The results as presented in Table II above show that the friability for an oxazolidone-modified isocyanurate foam, having a ratio of equivalent weight of NCO to epoxide of 1.0 to 0.05 (Comparison Foam C), is excessive based upon a visual measurement of friability of the fabricated foam. Based upon this visual measurement, Comparison Foam C is considered unacceptable for thermal barrier foam uses. In contrast, Foams 5 and 6 exhibit a cellular structure and low level of friability making them acceptable for foam use.

EXAMPLE 3

Preparation of Oxazolidone-Modified Isocyanurate Foams at the Upper End of Ratio of Equivalent Weight of NCO to Epoxide of the Present Invention This example provides a comparison of the scorching during fabrication of various oxazolidone-modified isocyanurate foams. These foams were produced in accordance with the procedure given in Example 1 using the foam formulations given in Table III below. Two of the foams, namely Foams 7 and 8 as identified in Table III below, have ratios of equivalent weight of NCO to epoxide at the upper end of the presently-claimed limit within the scope of the present invention. The third foam, namely Comparison Foam D identified in Table III below, has a ratio of equivalent weight of NCO to epoxide above the presently-claimed limit. The scorching results are presented in Table III below.

TABLE III

Oxazolidone-Modified Isocyanurate Foam
Comparative Data for Scorching of the Foam
12 inch × 12 inch × 8 inch Box Foam

| | Comparison Foam D | Foam 7 | Foam 8 |
|---|---|---|---|
| Foam Formulation | | | |
| DER-331[(2)] | 40.0 | 35.0 | 37.5 |
| DC-193[(4)] | 2.0 | 2.0 | 2.0 |
| DMP-30[(7)] | 2.5 | 2.5 | 2.5 |
| R-11 B[(8)] | 12.0 | 12.0 | 12.0 |
| PAPI-135[(9)] | 43.5 | 48.5 | 46.0 |
| Ratio of Equiv. Wt. NCO:Epoxide | 1.0–0.67 | 1.0–0.52 | 1.0–0.60 |
| Processing Data | | | |
| Cream Time (sec.) | 21.0 | 29.0 | 27.0 |
| Gel Time (sec.) | 85.0 | 129.0 | 107.0 |
| Tack Free Time (sec.) | 315.0 | 335.0 | 327.0 |
| Scorching[(11)] | Very excessive | None visible | Slightly visible |
| | Not Acceptable for foam use | Acceptable for use as a foam | Acceptable for foam use |

[(2), (4), (7), (8), (9)]Refer to the footnotes which appear in TABLE I above.
[(11)]A visual measurement after opening up the foam to expose a center section thereof.

The results as presented in Table III above demonstrate that the use of an amount of epoxide above the presently-claimed limit, based upon the ratio of equivalent weight of NCO to epoxide, such as the ratio provided by Comparison Foam D in Table III, results in a fabricated foam exhibiting excessive scorching on the interior thereof. This scorching is evident based upon a dark brown discoloration of an interior section of the foam. This excessive scorching is indicative of a degradation of interior cell structure, indicating that Comparison Foam D is not acceptable based upon this extent of scorching. It is theorized that this scorching is attributable to the exotherm produced by the NCO/epoxide reaction in this oxazolidone-modified isocyanurate foam. In contrast, fabrication of a foam using a ratio of NCO to epoxide at or close to the presently-claimed ratio of 1.0 equivalent weight of NCO to 0.60 equivalent of epoxide provides a foam exhibiting either none or only slightly visible scorching (Foams 7 and 8) and essentially no degradation of cellular structure.

What is claimed is:

1. A polyol-free composition useful for fabricating a high temperature degradation-resistant, rigid urethane-free oxazolidone-modified isocyanurate foam comprising:
   (a) at least one polyisocyanate having an isocyanate equivalent weight of between about 80 and about 160,
   (b) at least one polyepoxide present in an amount of between about 0.1 and about 0.6 equivalents of polyepoxide per equivalent of said polyisocyanate,
   (c) at least one catalyst to promote isocyanate trimerization and reaction of said polyepoxide with said polyisocyanate, and
   (d) at least one blowing agent.

2. A composition according to claim 1 which additionally contains a surfactant.

3. A composition according to claim 1 wherein said catalyst is a tertiary amine catalyst.

4. A composition according to claim 3 wherein said tertiary amine catalyst is 2,4,6-tri(dimethylaminomethyl)phenol.

5. A composition according to claim 1 wherein the polyisocyanate is a polymethylene polyphenyl isocyanate mixture containing from about 35 to about 85 percent by weight of methylenebis(phenyl isocyanate) the remainder of said mixture being polymethylene polyphenyl isocyanate of functionality greater than 2.0.

6. A composition according to claim 1 in which the polyepoxide is a diglycidyl ether of a non-fused polynuclear polyhydric phenol having the formula:

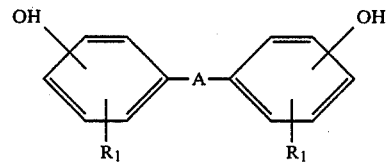

wherein $R_1$ represents from 0 to 4 substituents selected from the class consisting of halogen and lower-alkyl, and A is a bridging group selected from the class consisting of

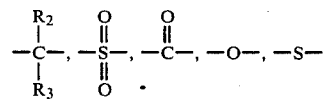

and a single covalent bond, wherein $R_2$ and $R_3$ each represent a moiety selected from the class consisting of hydrogen, lower-alkyl, lower-cycloalkyl, and aryl.

7. A composition according to claim 1 in which the polyepoxide is the polyglycidyl ether of a novolac resin.

8. A composition according to claim 1 in which the polyepoxide is a compound of the formula:

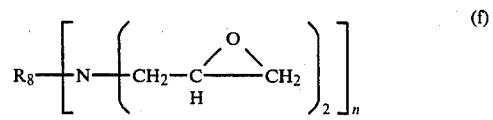

(f)

wherein n is an integer of from 1 to 3 and $R_8$ is an aromatic residue of valency n.

9. A composition according to claim 1 in which the blowing agent is selected from the group consisting of water, a halogenated aliphatic hydrocarbon having a boiling point within the range of about −20° C. to about 110° C., and mixtures thereof.

10. A composition according to claim 2 wherein said surfactant is a silicone surfactant.

11. A composition according to claim 2 wherein said surfactant is present in an amount of between about 1.0 and about 5.0 weight percent based upon the weight of the composition.

12. A method of producing a high temperature degradation-resistant, rigid urethane-free oxazolidone-modified isocyanurate foam made by reacting a polyol-free composition comprising at least one polyisocyanate having an isocyanate equivalent weight of between about 80 and about 160 with at least one polyepoxide in an amount of between 0.1 and 0.6 equivalents of polyepoxide per equivalent of said polyisocyanate in the presence of at least one catalyst and at least one blowing agent to provide said foam.

13. The method of claim 12 wherein said composition additionally contains a surfactant.

14. The method of claim 12 wherein said catalyst is a tertiary amine catalyst.

15. The method of claim 14 wherein said tertiary amine catalyst is 2,4,6-tri(dimethylaminomethyl)phenol.

16. The method of claim 12 wherein said polyisocyanate is a polymethylene polyphenyl isocyanate mixture containing from about 35 to about 85 percent by weight of methylenebis(phenyl isocyanate) the remainder of said mixture being polymethylene polyphenyl isocyanate of functionality greater than 2.0.

17. The method of claim 12 in which the polyepoxide is a diglycidyl ether of a non-fused polynuclear polyhydric phenol having the formula:

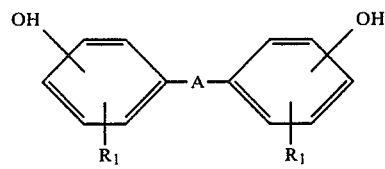

wherein $R_1$ represents from 0 to 4 substituents selected from the class consisting of halogen and lower-alkyl, and A is a bridging group selected from the class consisting of

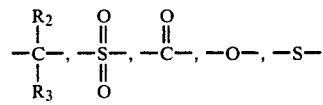

and a single covalent bond, wherein $R_2$ and $R_3$ each represent a moiety selected from the class consisting of hydrogen, lower-alkyl, lower-cycloalkyl, and aryl.

18. The method of claim 12 in which the polyepoxide is the polyglycidyl ether of a novolac resin.

19. The method of claim 12 in which the polyepoxide is a compound of the formula:

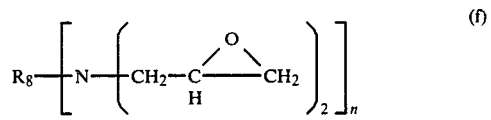 (f)

wherein n is an integer of from 1 to 3 and $R_8$ is an aromatic residue of valency n.

20. The method of claim 12 in which the blowing gent is selectedfrom the group consisting of water, a halogenated aliphatic hydrocarbon having a boiling point within the range of about −20° to about 110° C., and mixtures thereof.

21. The method of claim 13 wherein said surfactant is a silicone surfactant.

22. The method of claim 13 wherein said surfactant is present in an amount of between about 1.0 and about 5.0 weight percent based upon the weight of the composition.

23. The foam produced by the method of any of claims 12 to 22.

* * * * *